（12) United States Patent
Bao et al.

(10) Patent No.: US 9,105,135 B2
(45) Date of Patent: Aug. 11, 2015

(54) USING GENETIC ALGORITHM TO DESIGN 2-DIMENSIONAL PROCEDURAL PATTERNS

(71) Applicant: Adobe Systems Incorporated, San Jose, CA (US)

(72) Inventors: Fan Bao, Tempe, AZ (US); Radomir Mech, Mountain View, CA (US); Gavin Stuart Peter Miller, Los Altos, CA (US)

(73) Assignee: Adobe Systems Incorporated, San Jose, CA (US)

( * ) Notice: Subject to any disclaimer, the term of this patent is extended or adjusted under 35 U.S.C. 154(b) by 379 days.

(21) Appl. No.: 13/713,293

(22) Filed: Dec. 13, 2012

(65) Prior Publication Data

US 2014/0168254 A1    Jun. 19, 2014

(51) Int. Cl.
  *G09G 5/02*     (2006.01)
  *G09G 5/24*     (2006.01)
  *G09G 5/37*     (2006.01)
  *G06T 11/60*    (2006.01)
  *G06F 3/0481*   (2013.01)
  *G06F 3/0484*   (2013.01)

(52) U.S. Cl.
  CPC .............. *G06T 11/60* (2013.01); *G06F 3/0481* (2013.01); *G09G 5/24* (2013.01); *G06F 3/0484* (2013.01); *G06T 2201/00* (2013.01); *G09G 5/37* (2013.01)

(58) Field of Classification Search
  CPC combination set(s) only.
  See application file for complete search history.

(56) References Cited

U.S. PATENT DOCUMENTS

| | | | | |
|---|---|---|---|---|
| 7,885,463 | B2* | 2/2011 | Zhang et al. | 382/173 |
| 2006/0075382 | A1* | 4/2006 | Shaburov | 717/106 |
| 2010/0036753 | A1* | 2/2010 | Harvill et al. | 705/27 |
| 2013/0215152 | A1* | 8/2013 | Gibbon | 345/641 |
| 2013/0293657 | A1* | 11/2013 | Delmerico | 347/107 |

OTHER PUBLICATIONS

Wong, M. et al., Computer-Generated Floral Ornament, University of Washington, Proceedings from SIGGRAPH '98 Proceedings of the 25th annual conference on Computer Graphics and Interactive Techniques pp. 423-434, 1998.

\* cited by examiner

*Primary Examiner* — Wesner Sajous
(74) *Attorney, Agent, or Firm* — Kilpatrick Townsend & Stockton LLP

(57) ABSTRACT

Selection of an area of an image can be received. Selection of a subset of a plurality of predefined patterns may be received. A plurality of patterns can be generated. At least one generated pattern in the plurality of patterns may be based at least in part on one or more predefined patterns in the subset. Selection of another subset of patterns may be received. At least one pattern in the other subset of patterns may be selected from the plurality of predefined patterns and/or the generated patterns. Another plurality of patterns can be generated. At least one generated pattern in this plurality of patterns may be based at least on part on one or more patterns in the other subset. Selection of a generated pattern from the generated other plurality of patterns may be received. The selected area of the image may be populated with the selected generated pattern.

19 Claims, 12 Drawing Sheets

USING GENETIC ALGORITHM TO DESIGN 2-DIMENSIONAL PROCEDURAL PATTERNS

FIELD OF THE INVENTION

This disclosure relates generally to graphic design and more particularly relates to generating ornamental patterns in an image.

BACKGROUND

Designing an ornamental pattern has often involved a user creating a procedural model used to generate the pattern. Such models can be difficult to design and hard to control because they require users to learn the language of the procedural model. Accordingly, there is a need for efficient and/or otherwise improved systems and methods for designing ornamental patterns.

SUMMARY

One exemplary embodiment involves receiving a selection of an area; receiving a selection of a predefined pattern from a plurality of predefined patterns, the selected predefined pattern corresponding to a procedural model that was used to generate the selected predefined pattern, wherein the procedural model is defined in a way that is suitable for genetic exploration; generating a pattern based at least in part on the selected predefined pattern by modifying the procedural model and using the modified procedural model to generate the pattern; and applying the generated pattern to at least a portion of the selected area.

In another embodiment, a non-transitory computer-readable medium comprises program code for: receiving selection of an area of an image; receiving selection of a first subset of a plurality of predefined patterns; generating a first plurality of patterns, at least one generated pattern in the first plurality of patterns being based at least in part on one or more predefined patterns in the first subset; receiving selection of a second subset of patterns, at least one pattern in the second subset of patterns being selected from the plurality of predefined patterns or the first plurality of generated patterns; generating a second plurality of patterns, at least one generated pattern in the second plurality of patterns being based at least in part on one or more patterns in the second subset; receiving selection of a generated pattern from the second plurality of patterns; and populating the area of the image with the selected generated pattern, wherein each pattern in the plurality of predefined patterns corresponds with a respective procedural model that is defined in a way that is suitable for genetic exploration.

In yet another embodiment, a system comprises a display; an input device; a memory; and a processor in communication with the display, the input device, and the memory. In this embodiment, the processor is configured for: receiving, via the input device, selection of an area of an image; displaying, on the display, a plurality of predefined patterns; in response to receiving, via the input device, selection of a first subset of the plurality of predefined patterns, generating a first plurality of patterns, at least one generated pattern in the first plurality of generated patterns being based at least in part on one or more predefined patterns in the first subset; displaying, on the display, the first plurality of generated patterns; in response to receiving, via the input device, selection of a second subset of the first plurality of generated patterns, generating a second plurality of patterns, at least one generated pattern in the second plurality of generated patterns being based at least in part on one or more patterns in the second subset; displaying, on the display, the second plurality of generated patterns; and in response to receiving, via the input device, selection of a generated pattern from the second plurality of generated patterns, displaying, on the display, the area of the image comprising the selected generated pattern.

These illustrative features are mentioned not to limit or define the disclosure, but to provide examples to aid understanding thereof. Additional embodiments are discussed in the Detailed Description, and further description is provided there. Advantages offered by one or more of the embodiments may be further understood by examining this specification or by practicing one or more embodiments presented.

BRIEF DESCRIPTION OF THE FIGURES

These and other features, aspects, and advantages of the present disclosure are better understood when the following Detailed Description is read with reference to the accompanying drawings, where.

DETAILED DESCRIPTION

Figure 1:
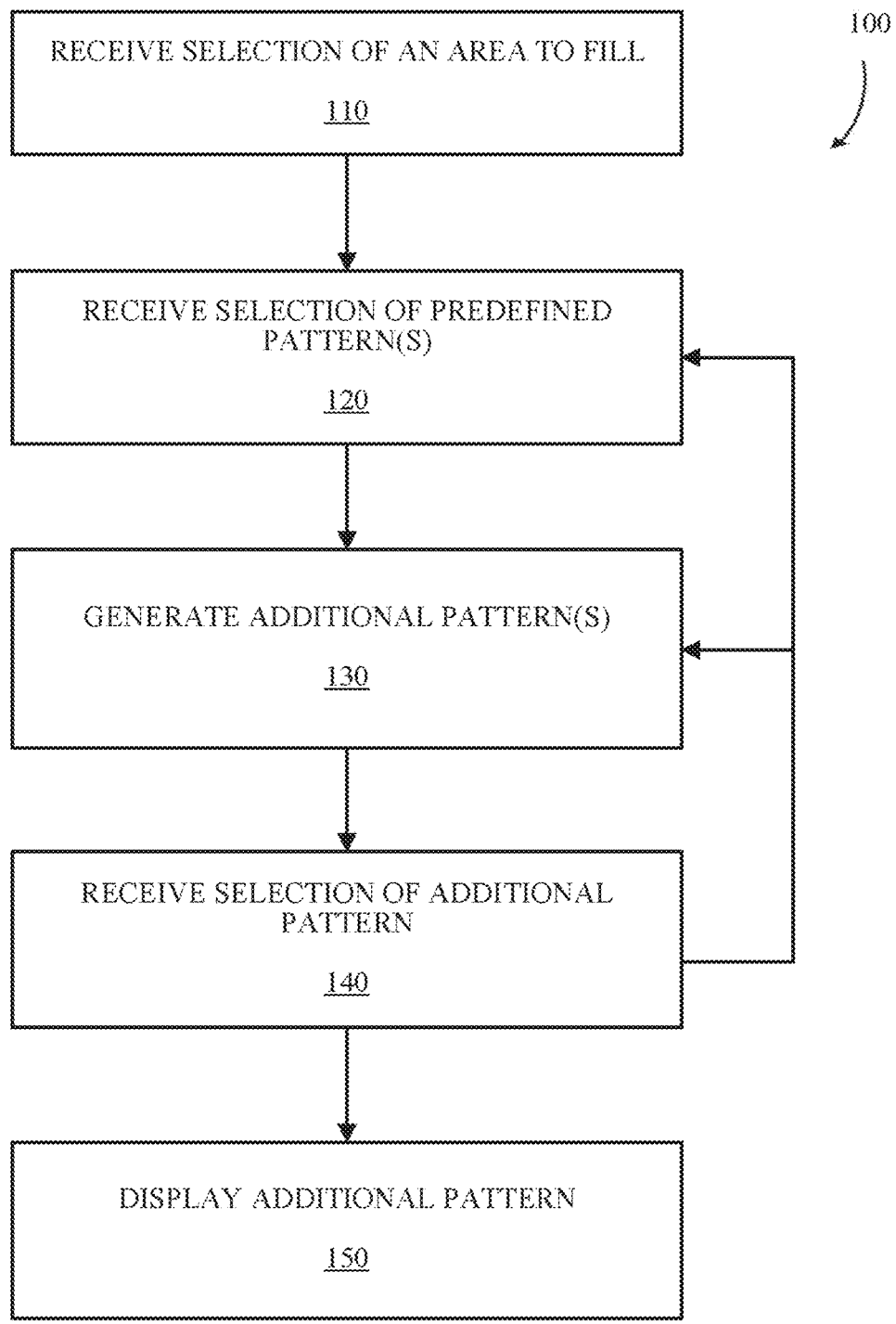
FIG. 1 is a flow chart directed to a method of designing an ornamental pattern according to an embodiment.

Systems and methods disclosed herein relate generally to generating ornamental patterns according to various embodiments. An ornamental pattern may be, for example, a decorative pattern or a non-functional design, or both. More particularly, systems and methods disclosed herein relate to generating new patterns based on selected patterns. For example, a pattern may be selected from a library of patterns associated with differing predefined procedural models. A procedural model can include various parameters and building blocks that can be used to generate a pattern. For example, a procedural model may include model parameters. A procedural model can include region queries that determine regions based at least in part on one or more algorithms, provide information about the geometries inside a current region and/or touching a current region, provide functions to obtain information related to a current state of a pattern such as finding a nearest point or testing an intersection, or a combination thereof. A procedural model can also include a populate procedure configured to populate geometries inside a region. For example, a procedural model may include a decision tree that can be used to determine which geometries to use and where geometries should be placed within a region.

In embodiments, a procedural model is defined such that it is suitable for genetic exploration. For example, a procedural model may be defined such that it can be mutated and/or crossed efficiently. As another example, a procedural model can be defined such that at each mutation and/or crossover the resulting procedural model will generate a reasonable fill of a selected input area. A procedural model can include region queries and populate procedures. In an embodiment, each procedural model in a plurality of procedural models includes one or more region queries and populate procedures. In this embodiment, the region queries and/or the populate procedures for a particular procedural model may be different than another selected procedural model. Thus, selected patterns used to generate a pattern may comprise and/or otherwise be associated with one or more differing region queries and/or populate procedures.

New patterns may be generated by at least applying mutations and/or crossovers to the procedural model corresponding to the selected pattern. For example, parameters of the procedural model can be modified and/or compatible building blocks of the procedural model can be swapped with other compatible building buildings within the procedural model and/or interchanged with compatible building blocks from another procedural model. The modified procedural model can be used to generate new patterns. These generated patterns can be similar to the selected pattern but different in one or more ways that make these generated patterns better suited to the user's particular needs. The newly generated patterns can be displayed and one or more of these new patterns can be selected. Additional patterns may be generated based at least in part on variations to the procedural models corresponding to the selected new patterns. This process may repeat until a desired pattern is found. Numerous other embodiments are disclosed herein and variations are within the scope of this disclosure.

Referring now to FIG. 1, this figure illustrates a flow chart directed to a method 100 of generating an ornamental pattern according to an embodiment. Such a method 100 may be performed by one or more electronic devices, such as a tablet computer, mobile phone, or other computing device comprising and/or in communication with an input device such as a mouse, keyboard, touch-screen, or other input device.

The method 100 shown in FIG. 1 begins in block 110 when a selection of an area to fill is received. For example, an image editing application being executed on an electronic device may receive a selection of an area of an image to fill. As another example, an image editing application being executed on an electronic device may receive selection of a portion of one or more layers of an image to fill.

Once the selection of an area to fill is received 110, selection of at least one predefined pattern is received 120. For example, an image editing application being executed on an electronic device may display an interface that enables selection of one or more predefined patterns. The interface can include checkboxes, radio buttons, or other elements configured to indicate which, if any, of the predefined patterns are selected. As one example, if a predefined pattern is selected, then a checkbox associated with that predefined pattern may be checked. As another example, a portion of the interface associated with a particular predefined pattern may be shaded when that particular predefined pattern is selected.

Selection of at least one predefined pattern may be received in numerous ways. For example, selection of at least one predefined pattern may be received via a mouse, a keyboard, a touch-sensitive input device, other input devices, or a combination thereof. Thus, in embodiments, a predefined pattern may be selected by using a mouse to position a cursor over a portion of an interface corresponding to the predefined pattern and clicking a button on the mouse. As another example, if the electronic device comprises a touch-screen display, then a user may be able to select a particular predefined pattern by contacting a location of the touch-screen display corresponding to that predefined pattern. In one embodiment, a thumbnail image or other representation of a particular predefined pattern may be displayed and that predefined pattern may be selected by selecting the thumbnail image or other representation corresponding to that predefined pattern.

After receiving selection of at least one predefined pattern 120, one or more additional patterns are generated 130. For example, an image editing application being executed on an electronic device may generate one or more additional patterns. An additional pattern may be based at least in part on one or more of the selected predefined patterns. For example, an additional pattern may be generated by modifying parameters of a procedural model associated with a selected predefined pattern. As another example, an additional pattern may be generated by crossing parameters and/or building blocks from a first input model associated with a first selected predefined pattern with parameters and/or building blocks from a second input model associated with a second selected predefined pattern. In some embodiments, an additional pattern is generated by modifying parameters or crossing compatible parameters, or both.

After generating one or more additional patterns 130, selection of an additional pattern from the one or more generated additional patterns is received 140. For example, an image editing application being executed on an electronic device may display an interface that enables selection of one of the generated additional patterns. The interface can include checkboxes, radio buttons, or other elements configured to indicate which, if any, additional patterns are selected. As one example, if an additional pattern is selected, then a checkbox associated with that additional pattern may be checked. As another example, a portion of the interface corresponding to a particular additional pattern may be shaded when that particular additional pattern is selected. Thus, the interface may visually indicate which, if any, patterns are selected.

Selection of an additional pattern may be received in numerous ways. For example, selection an additional pattern may be received via a mouse, a keyboard, a touch-sensitive input device, other input devices, or a combination thereof. Thus, in embodiments, an additional pattern may be selected by using a mouse to position a cursor over a portion of an interface corresponding to the additional pattern and clicking a button on the mouse. As another example, if the electronic device comprises a touch-screen display, then a user may be able to select a particular additional pattern by contacting a location of the touch-screen display corresponding to that generated additional pattern. In one embodiment, a thumbnail image or other representation of a particular generated pattern may be displayed. The generated pattern may be selected by selecting the thumbnail image or other representation of the generated pattern.

In some embodiments, even more additional patterns are generated. For example, even more patterns may be generated by selecting and/or de-selecting one or more predefined patterns 120. In this embodiment, even more patterns may be generated when a user selects another predefined pattern and/or deselects a selected predefined pattern. As another example, even more patterns may be generated when one or more of the additional patterns are selected. Thus, in embodiments, the method 100 shown in FIG. 1 can cycle through blocks 120-140 and/or blocks 130-140 until a satisfactory additional pattern is generated.

A generated pattern may be based in part on selected predefined patterns, unselected predefined patterns, selected generated patterns, unselected generated patterns, or a combination thereof. For example, a new generated pattern may be based at least in part on a selected predefined pattern and a selected additional pattern that was generated. In one embodiment, even more patterns are generated in response to the selection of a "Refresh" option. For example, when the "Refresh" option is selected, new patterns may be generated based at least in part on one or more selected predefined patterns. The new patterns may be generated by changing parameters and/or building blocks of one or more of the selected predefined patterns. Numerous other embodiments are disclosed herein and variations are within the scope of this disclosure.

After receiving selection of an additional pattern from the one or more generated additional patterns 140, the selected additional pattern is displayed 150. For example, an image editing application being executed on an electronic device may display the selected generated pattern within the selected area. Thus, if the selected area is a circle within an image, then the pattern may be displayed within the circle. In embodiments, the pattern is displayed only within the selected area of the image. In other embodiments, the pattern is displayed within the selected area of one or more selected layers of an image.

A pattern may be displayed in numerous ways. In one embodiment, a pattern is displayed within the selected area in real-time or substantially real-time as a user selected a generated pattern. Thus, a user may be able to preview what a particular selected generated pattern will look like in the selected area. In some embodiments, a selected pattern is displayed within the selected area upon receiving an indication that the pattern should be displayed within the selected area. For example, a user may select a "Finish" button, a "Complete" button, or an "OK" button within an interface to indicate that the selected pattern should be displayed within the selected area. Numerous other embodiments are disclosed herein and variations are within the scope of this disclosure.

These illustrative examples are given to introduce the reader to the general subject matter discussed here and are not intended to limit the scope of the disclosed concepts. The following sections describe various additional embodiments and examples with reference to the drawings in which like numerals indicate like elements. Other embodiments will readily suggest themselves to such skilled persons having the benefit of this disclosure. In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application-related or business-related constraints, or both, and that these specific goals will vary from one implementation to another and from one developer to another.

Illustrative Electronic Device

Figure 2:
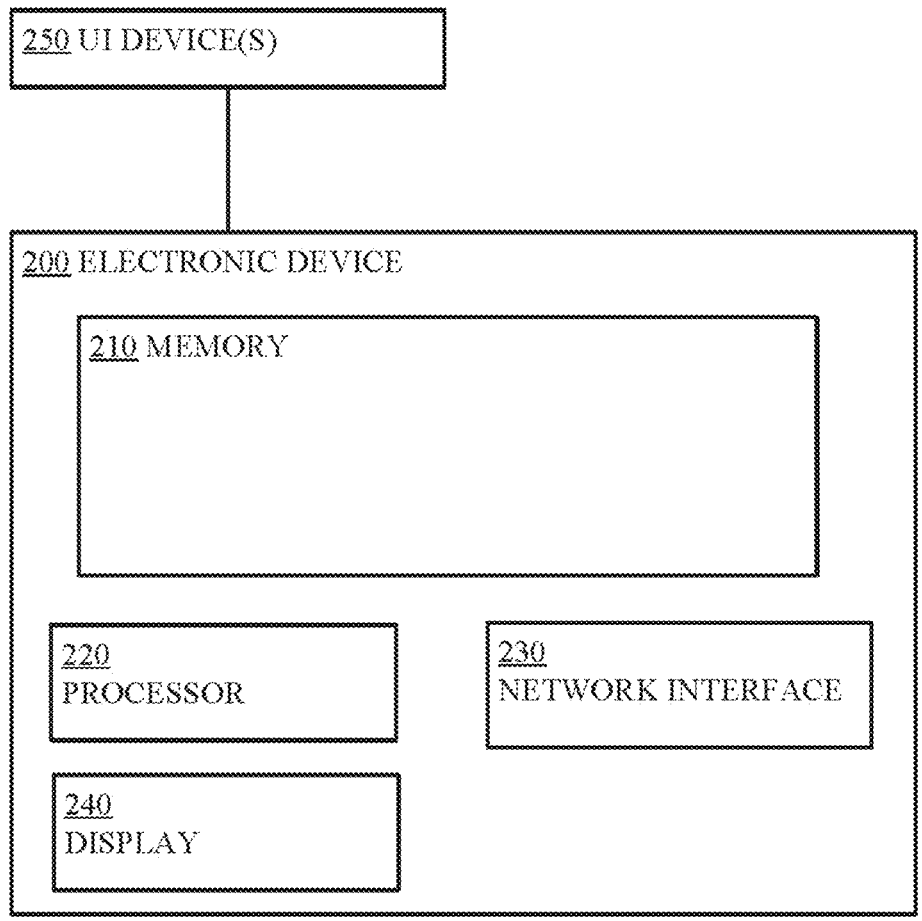
FIG. 2 is a block diagram depicting an exemplary electronic device according to an embodiment.

FIG. 2 is a block diagram depicting an exemplary electronic device according to an embodiment. For example, in one embodiment, electronic device 200 is a tablet computer. In other embodiments, electronic device 200 can be a mobile phone, a personal digital assistant (PDA), a laptop, a desktop computer, or another suitable computing device. An electronic device may include additional or fewer components than the electronic device 200 shown in FIG. 2. For example, in an embodiment, an electronic device comprises the memory 210, the processor 220, the network interface 230, the display 240, and also includes at least one additional component such as a camera. As another example, in one embodiment, the electronic device 200 does not comprise a network interface 230. Numerous configurations having fewer or additional components for the electronic device 200 are within the scope of this disclosure.

As shown in FIG. 2, the electronic device 200 comprises a computer-readable medium 210, such as a random access memory (RAM), coupled to a processor 220 that executes computer-executable program instructions and/or accesses information stored in memory 210. A computer-readable medium may comprise, but is not limited to, an electronic, optical, magnetic, or other storage device capable of providing a processor with computer-readable instructions. Other examples comprise, but are not limited to, a floppy disk, CD-ROM, DVD, magnetic disk, memory chip, ROM, RAM, SRAM, DRAM, CAM, DDR, flash memory such as NAND flash or NOR flash, an ASIC, a configured processor, optical storage, magnetic tape or other magnetic storage, or any other medium from which a computer processor can read instructions. In one embodiment, the electronic device 200 may comprise a single type of computer-readable medium such as random access memory (RAM). In other embodiments, the electronic device 200 may comprise two or more types of computer-readable medium such as random access memory (RAM), a disk drive, and cache. The electronic device 200 may be in communication with one or more external computer-readable mediums such as an external hard disk drive or an external DVD drive.

The embodiment shown in FIG. 2 comprises a processor 220 which executes computer-executable program instructions and/or accesses information stored in memory 210. The instructions may comprise processor-specific instructions generated by a compiler and/or an interpreter from code written in any suitable computer-programming language including, for example, C, C++, C#, Visual Basic, Java, Python, Perl, JavaScript, and ActionScript®. In an embodiment, the electronic device 200 comprises a single processor 220. In other embodiments, the electronic device 200 comprises two or more processors.

The electronic device 200 as shown in FIG. 2 comprises a network interface 230 for communicating via wired or wireless communication. For example, the network interface 230 may allow for communication over networks via Ethernet, IEEE 802.11 (Wi-Fi), 802.16 (Wi-Max), Bluetooth, infrared, etc. As another example, network interface 230 may allow for communication over networks such as CDMA, GSM, UMTS, or other cellular communication networks. The electronic device 200 may comprise two or more network interfaces 230 for communication over one or more networks.

The electronic device 200 may comprise and/or be in communication with any number of external or internal devices such as a mouse, a CD-ROM, DVD, a keyboard, a display, audio speakers, one or more microphones, or any other input or output devices, or both. For example, the electronic device 200 shown in FIG. 2 comprises a display 240 and is in communication with various user interface (UI) devices 250. Display 240 may use any suitable technology including, but not limited to, LCD, LED, CRT, and the like. In one embodiment, the display 240 is a touch-sensitive display. In other embodiments, the display 240 is not touch-sensitive. Numerous other embodiments are disclosed herein and variations are within the scope of this disclosure.

Electronic device 200 may be a tablet computer, a personal computing device, a mobile phone, a desktop computer, or any other electronic device suitable for providing one or more of the features described herein.

Illustrative System

Figure 3:
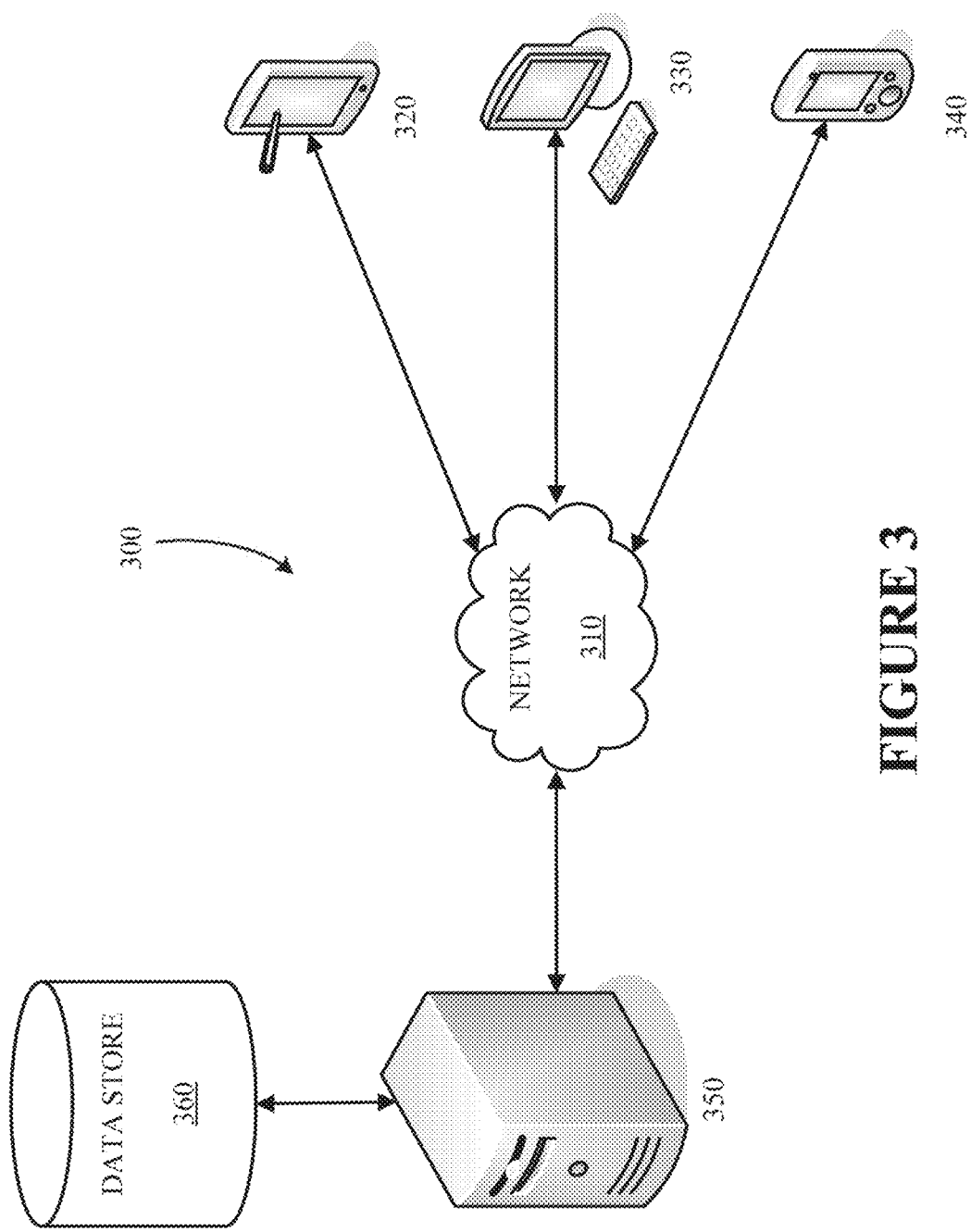
FIG. 3 is a system diagram depicting exemplary computing devices in an exemplary computing environment according to an embodiment.

FIG. 3 illustrates a system diagram depicting exemplary computing devices in an exemplary computing environment according to an embodiment. The system 300 shown in FIG. 3 includes three electronic devices, 320-340, and a web server 350. Each of the electronic devices, 320-340, and the web server 350 are connected to a network 310. In this embodiment, each of the electronic devices, 320-340, is in communication with the web server 350 through the network 310. Thus, each of the electronic devices, 320-340, can send requests to the web server 350 and receive responses from the web server 350 through the network 310.

In an embodiment, the network 310 shown in FIG. 3 facilitates communications between the electronic devices, 320-340, and the web server 350. The network 310 may be any suitable number or type of networks or links, including, but not limited to, a dial-in network, a local area network (LAN), wide area network (WAN), public switched telephone network (PSTN), the Internet, an intranet or any combination of hard-wired and/or wireless communication links. In one embodiment, the network 310 may be a single network. In other embodiments, the network 310 may comprise two or more networks. For example, the electronic devices 320-340 may be connected to a first network and the web server 350 may be connected to a second network and the first and the second network may be connected. Numerous other network configurations are disclosed herein and others are within the scope of this disclosure.

An electronic device may be capable of communicating with a network, such as network 310, and be capable of sending and receiving information to and from another device, such as web server 350. For example, in FIG. 3, one electronic device may be a tablet computer 320. The tablet computer 320 may include a touch-sensitive display and be able to communicate with the network 310 by using a wireless network interface card. In this embodiment, the tablet computer 320 may be able to communicate with the web server 350 through the network 310. Another device that may be an electronic device shown in FIG. 3 is a desktop computer 330. The desktop computer 330 may be in communication with a display and be able to connect to the network 330 through a wired network connection. The desktop computer 330 may be in communication with any number of input devices such as a keyboard or a mouse. In FIG. 3, a mobile phone 340 may be an electronic device. The mobile phone 340 may be able to communicate with the network 310 over a wireless communications means such as TDMA, CDMA, GSM, or WiFi. Numerous other embodiments are disclosed herein and others are within the scope of this disclosure.

A device receiving a request from another device may be any device capable of communicating with a network, such as network 310, and capable of sending and receiving information to and from another device. For example, in the embodiment shown in FIG. 3, the web server 350 may be a device receiving a request from another device (i.e. electronic devices 320-340) and may be in communication with network 310. A receiving device may be in communication with one or more additional devices, such as additional servers. For example, web server 350 in FIG. 3 may be in communication with another server that stores full resolution images, lower resolution copies of full resolution images, one or more layers of an image, thumbnail images, information associated with one or more images, user account information, predefined patterns, procedural models, input models, default parameters, minimum parameters, maximum parameters, compatibility information for predefined patterns, previously-generated patterns, representations for predefined patterns, other information associated with predefined patterns, or a combination thereof.

In one embodiment, the web server 350 may store full resolution images, lower resolution copies of full resolution images, one or more layers of an image, thumbnail images, information associated with one or more images, user account information, predefined patterns, procedural models, input models, default parameters, minimum parameters, maximum parameters, compatibility information for predefined patterns, previously-generated patterns, representations for predefined patterns, other information associated with predefined patterns, or a combination thereof. In an embodiment, a web server may communicate with one or more additional devices to process a request received from an electronic device. For example, web server 350 in FIG. 3 may be in communication with a plurality of additional servers, at least one of which may be used to process at least a portion of a request from any of the electronic devices 320-340. In one embodiment, web server 350 may be part of or in communication with a content distribution network (CDN) that stores data related to one or more images.

One or more devices may be in communication with a data store. For example, in FIG. 3, web server 350 is in communication with data store 360. In embodiments, data store 360 is operable to receive instructions from web server 350 and/or other devices in communication with data store 360 and obtain, update, or otherwise process data in response to receiving the instructions. Data store 360 may contain information associated with images having a plurality of layers, one or more layers of an image, full resolution images, reduced resolution images, full sized images, reduced sized images, composite images, thumbnail images, image location, account information, predefined patterns, procedural models, input models, default parameters, minimum parameters, maximum parameters, compatibility information for predefined patterns, previously-generated patterns, representations for predefined patterns, other information associated with predefined patterns, or a combination thereof. For example, data store 360 may contain an image identifier that is usable to determine a location where the image is stored. Data store 360 may contain layer identifiers that are usable to identify one or more layers associated with an image. In one embodiment, a layer identifier is usable to determine a location where a thumbnail image of the layer is stored. As another example, data store 360 may contain an identification that associates a predefined pattern with a representation of the predefined pattern.

Data store 360 shown in FIG. 3 can receive requests from web server 350 and send responses to web server 350. For example, web server 350 may request a listing of predefined patterns. As another example, web server 350 may request information for one or more compatible predefined patterns. In response to receiving the request, data store 360 may send the requested information about the predefined patterns, procedural models, input models, default parameters, minimum parameters, maximum parameters, compatibility information for predefined patterns, previously-generated patterns, representations for predefined patterns, other information associated with predefined patterns, images, other requested information, or a combination thereof to web server 350. In embodiments, data store 360 can send receive, add, update, or otherwise manipulate information based at least in part on one or more requests received from another device or network, such as web server 350, network 310, or another network or device in communication with data store 360. For example, web server 350 may query data store 360 to determine whether information associated with a particular predefined pattern should be sent to an electronic device in response to the web server 350 receiving a request from the electronic device.

Method of Generating an Ornamental Design in an Image

Figure 4:
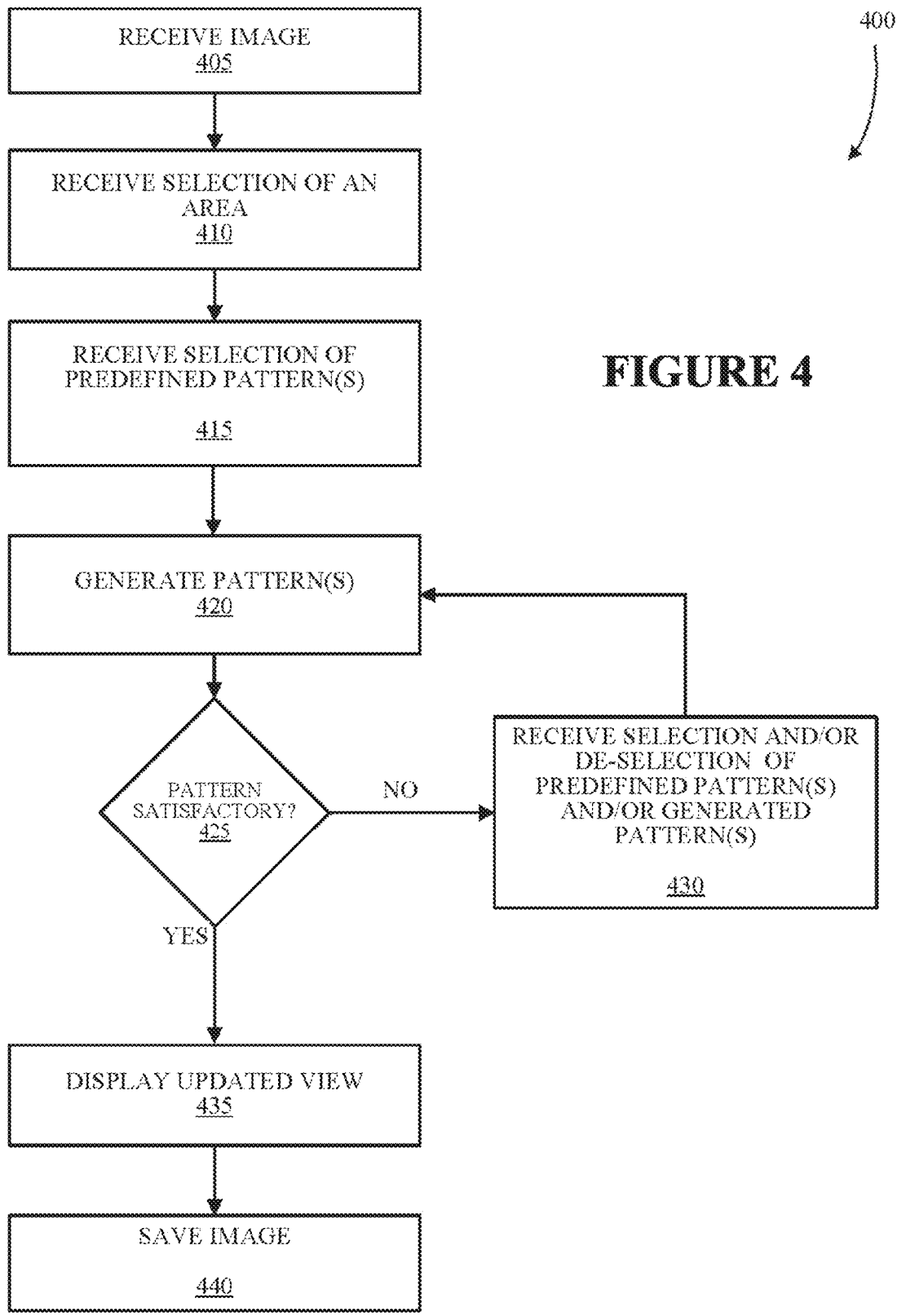
FIG. 4 is a flow chart illustrating a method of generating an ornamental pattern according to an embodiment.

Referring now to FIG. 4, FIG. 4 is a flow chart illustrating a method 400 of generating an ornamental pattern according to an embodiment. The description of the method 400 of FIG. 4 will be made with respect to FIGS. 2 and 3.

The method 400 shown in FIG. 4 begins when one or more images are received 405. For example, referring to FIG. 2, the processor 220 of the electronic device 200 may receive one or more images from memory 210. In another embodiment, the electronic device 200 may receive one or more images from another device through the network interface 230, from a hard disk drive, from another storage device, or a combination thereof. For example, referring to FIG. 3, tablet computer 320 may receive one or more images stored at web server 350 and/or data store 360 through network 310. The web server 350 may send one or more images to the tablet computer 320 in response to receiving a request from the tablet computer 320. In other embodiments, the web server 350 pushes one or more images to the tablet computer 320 without receiving a request from the tablet computer 320. The one or more images may be received by an image editing application being executed on the electronic device 200. For example, referring to FIG. 2, the memory 210 may have program code stored thereon for an image editing application. In this embodiment, the processor 220 may receive the program code for the image editing application from the memory 210 and execute at least a portion of the program code for the image editing application to receive one or more images. In another embodiment, the processor 220 receives program code for an image editing application from another device through the network interface 230. For example, referring to FIG. 3, tablet computer 320 may receive program code for receiving one or more images stored at web server 350 and/or data store 360 through network 310.

In one embodiment, one or more of the received images 405 comprises a plurality of layers. For example an image may comprise five layers. In this embodiment, each layer may be indicated by a thumbnail image corresponding to that layer. In another embodiment, one or more received images 405 comprise a single layer. An image editing application may be capable of manipulating an image to increase and/or decrease the number of layers in the image. For example, if an image comprises a single layer, then the image editing application can be used to add a second layer to the image. As another example, the image editing application can be used to remove the third layer of an image comprising four layers. Numerous other embodiments with respect to manipulating layers of an image and/or functionalities of an image editing application are disclosed herein and variations are within the scope of this disclosure.

Referring back to FIG. 4, after receiving the image 405, the method 400 proceeds to block 410. In block 410, selection of one or more areas are received. For example, referring to FIG. 2, the processor 220 of the electronic device 200 may receive selection of one or more areas through one or more user input devices 250. In another embodiment, the electronic device 200 may receive selection of one or more areas from another device through the network interface 230. For example, referring to FIG. 3, tablet computer 320 may receive selection of one or more areas from desktop computer 330 through network 310. The desktop computer 330 may send information indicating the selection of one or more areas to the tablet computer 320 in response to receiving input from one or more user input devices associated with the desktop computer 330. The desktop computer 330 may send information indicating the selection of one or more areas to the tablet computer 320 in response to receiving a request from the tablet computer 320. In other embodiments, the desktop computer 330 pushes information indicating the selection of one or more areas to the tablet computer 320 without receiving a request from the tablet computer 320. The selection of one or more areas may be received by an image editing application being executed on the electronic device 200. For example, referring to FIG. 2, the memory 210 may have program code stored thereon for an image editing application. In this embodiment, the processor 220 may receive program code for the image editing application that is configured to request and/or receive selection of one or more areas. In another embodiment, the processor 220 receives program code configured to request and/or receive selection of one or more areas through the network interface 230. For example, referring to FIG. 3, tablet computer 320 may receive program code for receiving selection of one or more areas from another device, such as desktop computer 330, through network 310.

Selection of one or more areas may be received in any number of ways. For example, selection of one or more areas may be received through an input device associated with an electronic device. As another example, selection of one or more areas can be received through a network interface associated with an electronic device. The selection may comprise a selection of a single area. For example, the selection may be a single area of an image. In another embodiment, the selection may be a single area within a particular layer of an image. In some embodiments, the selection may comprise a selection of multiple areas. For example, a selection may include a first area of an image and a second area of the image. As another example, a selection can include a first area within a first layer of an image and a second area within a second layer of the image. In embodiments, a selection of one or more areas may be made using two or more images. For example, selection of one or more areas may include selection of a first area of a first image and selection of a second area of a second image.

Selection of one or more areas can be made within an image editing application. For example, an image editing application being executed on an electronic device may receive selection of one or more areas corresponding to portions of one or more images being editing in the image editing application. The image editing application may display an interface that enables a user to select one or more areas of one or more images. For example, referring to FIG. 3, tablet computer 320 may comprise a touch-screen that can be used to display one or more images and receive input from a user of the tablet computer 320 that indicates the selection of one or more areas.

An area can include any number of shapes. For example, in one embodiment, an area is a circle. In other embodiments, an area can include but is not limited to a square, a rectangle, a triangle, a custom shape, another shape, or a combination thereof. An area may be a two-dimensional area. In some embodiments, an area is three-dimensional. Numerous other embodiments are disclosed herein and variations are within the scope of this disclosure.

Referring back to FIG. 4, after receiving selection of one or more areas 410, the method 400 proceeds to block 415. In block 415, selection of one or more predefined patterns are received. For example, referring to FIG. 2, the processor 220 of the electronic device 200 may receive selection of one or more predefined patterns through one or more user input devices 250. In another embodiment, the electronic device 200 may receive selection of one or more predefined patterns from another device through the network interface 230. For example, referring to FIG. 3, tablet computer 320 may receive selection of one or more predefined patterns from desktop computer 330 through network 310. The desktop computer 330 may send information indicating the selection of one or more predefined patterns to the tablet computer 320 in response to receiving input from one or more user input devices associated with the desktop computer 330. The desktop computer 330 may send information indicating the selection of one or more predefined patterns to the tablet computer 320 in response to receiving a request from the tablet computer 320. In other embodiments, the desktop computer 330 pushes information indicating the selection of one or more predefined patterns to the tablet computer 320 without receiving a request from the tablet computer 320. The selection of one or more predefined patterns may be received by an image editing application being executed on the electronic device 200. For example, referring to FIG. 2, the memory 210 may have program code stored thereon for an image editing application. In this embodiment, the processor 220 may receive program code for the image editing application that is configured to request and/or receive selection of one or more predefined patterns. In another embodiment, the processor 220 receives program code configured to request and/or receive selection of one or more predefined patterns through the network interface 230. For example, referring to FIG. 3, tablet computer 320 may receive program code for receiving selection of one or more predefined patterns from another device, such as desktop computer 330, through network 310.

Selection of one or more predefined patterns may be received in any number of ways. For example, selection of one or more predefined patterns may be received through an input device associated with an electronic device. As another example, selection of one or more predefined patterns can be received through a network interface associated with an electronic device. The selection may comprise a selection of a single predefined pattern. In other embodiments, the selection may comprise a selection of two or more predefined patterns.

Selection of one or more predefined patterns can be made within an image editing application. For example, an image editing application being executed on an electronic device may receive selection of one or more predefined patterns. The image editing application may display an interface that enables a user to select one or more predefined patterns. The interface may include checkboxes, radio buttons, or other indications configured to show which, if any, of the predefined patterns are selected. For example, the interface may shade areas associated with selected predefined patterns.

The selection of one or more predefined patterns may be received via an interface in numerous ways. For example, selection of at least one predefined pattern may be received via a mouse, a keyboard, a touch-sensitive input device, other input devices, or a combination thereof. Thus, in embodiments, a predefined pattern may be selected by using a mouse to position a cursor over a portion of an interface corresponding to the predefined pattern and clicking a button on the mouse. As another example, if the electronic device comprises a touch-screen display, then a user may be able to select a particular predefined pattern by contacting a location of the touch-screen display corresponding to that predefined pattern. In one embodiment, a thumbnail image or another representation of a particular predefined pattern may be displayed and that predefined pattern may be selected by selecting the thumbnail image or other representation of the predefined pattern. Thus, in embodiments, a predefined pattern may be selected by selecting a representation corresponding to that predefined pattern. Examples of representations include, but are not limited to, an image such as a thumbnail image corresponding to a particular predefined pattern, text corresponding to a particular predefined pattern, an identifier corresponding to a particular predefined pattern, or another visual representation displayed on the interface that corresponds with a particular predefined pattern. Numerous other embodiments are disclosed herein and variations are within the scope of this disclosure.

One or more predefined patterns may be received in any number of ways. For example, referring to FIG. 2, the processor 220 of the electronic device 200 may receive one or more predefined patterns from memory 210. In another embodiment, the electronic device 200 may receive one or more predefined patterns from another device through the network interface 230, from a hard disk drive, from another storage device, or a combination thereof. For example, referring to FIG. 3, tablet computer 320 may receive one or more predefined patterns stored at web server 350 and/or data store 360 through network 310. The web server 350 may send one or more predefined patterns to the tablet computer 320 in response to receiving a request from the tablet computer 320. In other embodiments, the web server 350 pushes one or more predefined patterns to the tablet computer 320 without receiving a request from the tablet computer 320. The one or more predefined patterns may be received by an image editing application being executed on the electronic device 200. For example, referring to FIG. 2, the memory 210 may have program code stored thereon for an image editing application. In this embodiment, the processor 220 may receive the program code for the image editing application from the memory 210 and execute at least a portion of the program code for the image editing application to receive one or more predefined patterns. In another embodiment, the processor 220 receives program code for an image editing application from another device through the network interface 230. For example, referring to FIG. 3, tablet computer 320 may receive program code for receiving one or more predefined patterns stored at web server 350 and/or data store 360 through network 310.

In some embodiments, information associated with one or more predefined patterns may be received. For example, in one embodiment, representations for one or more predefined patterns may be received. A representation and/or other information corresponding to a predefined pattern may be received in any number of ways, such as those discussed above with respect to receiving one or more predefined patterns. For example, referring to FIG. 2, the processor 220 of the electronic device 200 may receive a representation that corresponds with a particular predefined pattern from memory 210. In another embodiment, the electronic device 200 may receive one or more representations corresponding to one or more predefined patterns from another device through the network interface 230, from a hard disk drive, from another storage device, or a combination thereof. For example, referring to FIG. 3, tablet computer 320 may receive one or more thumbnail images corresponding to one or more predefined patterns stored at web server 350 and/or data store 360 through network 310. In embodiments, one or more predefined patterns and/or representations associated with one or more predefined patterns may be stored in a database, a library, a list, another storage device, or a combination thereof. Numerous other embodiments are disclosed herein and variations are within the scope of this disclosure.

Referring back to FIG. 4, after receiving selection of one or more predefined patterns 415, the method 400 proceeds to block 420. In block 420, one or more patterns are generated. For example, referring to FIG. 2, the processor 220 of the electronic device 200 may generate one or more patterns. In another embodiment, the electronic device 200 may receive one or more generated patterns from another device through the network interface 230, from a hard disk drive, from another storage device, or a combination thereof. For example, referring to FIG. 3, tablet computer 320 may receive one or more patterns generated by web server 350 and/or one or more generated patterns stored in data store 360 through network 310. The web server 350 may send one or more generated patterns to the tablet computer 320 in response to receiving a request from the tablet computer 320. For example, the tablet computer 320 may send a request comprising information indicating which patterns have been selected to web server 350. The web server 350 may receive the request from tablet computer 320 and generate one or more patterns. A generated pattern may be based at least in part on information received in the request. For example, a generated pattern may be based at least in part on the selected patterns indicated in the request. The web server 350 can send one or more generated patterns to tablet computer 320.

In some embodiments, the web server 350 pushes one or more generated patterns to the tablet computer 320. One or more generated may be received by an image editing application being executed on the electronic device 200. For example, referring to FIG. 2, the memory 210 may have program code stored thereon for an image editing application. In this embodiment, the processor 220 may receive the program code for the image editing application from the memory 210 and execute at least a portion of the program code for the image editing application to generate one or more patterns and/or to receive one or more generated patterns from another device. In another embodiment, the processor 220 receives program code for an image editing application from another device through the network interface 230. For example, referring to FIG. 3, tablet computer 320 may receive program code for receiving one or more generated patterns from web server 350 and/or data store 360 through network 310.

A pattern may be generated in any number of ways. In one embodiment, a generated pattern is based at least in part on one or more of the selected predefined patterns. For example, a predefined pattern may correspond with a procedural model used to generate the predefined pattern and the generated pattern may be based at least in part on the procedural model. In this embodiment, at least a portion of the procedural model may be mutated and/or a portion of the procedural model may be crossed with another compatible component and the mutated and/or crossed procedural model may be used to generate a new pattern. For example, a parameter associated with a procedural model may be mutated and used to generate a new pattern. As another example, a component of a procedural model may be replaced with another compatible component and used to generate a new pattern. Thus, in embodiments, a generated pattern is based at least in part on one or more mutated parameters for a procedural model or one or more components of the procedural model that are crossed with other compatible components, or both.

In one embodiment, a first building block associated with a first selected predefined pattern may be crossed with a second building block associated with a second selected predefined pattern and used to generate a pattern. A building block can include any component of a procedural model that is compatible with another component and used to create a pattern. Thus, in embodiments, a generated pattern may be created by crossing parts of a first pattern with compatible parts of a second pattern. A generated pattern can be created by crossing one or more compatible components of a first procedural model corresponding to a first predefined pattern with one or more compatible components of a second procedural model corresponding to a second predefined pattern.

In some embodiments, a generated pattern may be created by modifying one or more parameters associated with a first selected predefined pattern and crossing one or more compatible components of the first selected predefined pattern with one or more compatible components of a second selected predefined pattern. In other embodiments, a generated pattern is created by also modifying one or more parameters associated with the second selected predefined pattern. A generated pattern can be generated by mutating one or more parameters of a first procedural model corresponding to a first selected predefined pattern and/or crossing one or more compatible components of the first procedural model with one or more compatible components of a second procedural model corresponding to a second selected predefined pattern.

In embodiments, a generated pattern is based at least in part on one or more selected previously generated patterns, such as a pattern that was generated in a previous iteration of block 420 and selected in block 430. For example, a generated pattern may be created by modifying one or more parameters associated with a selected previously generated pattern. As another example, one or more building blocks associated with a selected previously generated pattern may be crossed with one or more building blocks associated with another selected previously generated pattern and/or a selected predefined pattern to generate a pattern. Thus, in various embodiments, a pattern can be generated based at least in part on parameters of one or more patterns or compatible components of one or more patterns, or both. Similarly, a pattern can be generated based at least in part on predefined patterns or previously generated patterns, or both.

In embodiments, a procedural model is defined such that it is suitable for genetic exploration. For example, a procedural model may be defined such that it can be mutated and/or crossed efficiently. In one embodiment, a procedural model suitable for genetic exploration is a procedural model that can be mutated. In another embodiment, a procedural model suitable for genetic exploration is a procedural model where at least a portion of the procedural model can be crossed. For example, a part of one procedural model may be crossed with a part of another procedural model. In some embodiments, a procedural model suitable for genetic exploration is a procedural model that can be both mutated and crossed. A procedural model may be defined such that at each mutation and/or crossover the resulting procedural model will generate a reasonable fill of a selected input area. In one embodiment, a procedural model that is suitable for genetic exploration is a procedural model that at each mutation or crossover, or both, the resulting procedural model will generate a fill of a selected input area. In another embodiment, a procedural model that is suitable for genetic exploration is a procedural model that at each mutation or crossover, or both, the resulting procedural model will generate a pattern, such as an ornamental pattern, for a selected input area. Numerous other embodiments are disclosed herein and variations are within the scope of this disclosure.

A procedural model can include region queries and populate procedures, as discussed in more detail below. In an embodiment, each procedural model in a plurality of procedural models includes one or more region queries and populate procedures. In this embodiment, the region queries and/or the populate procedures for a particular procedural model may be different than another procedural model in the plurality of procedural models. Thus, selected patterns used to generate a pattern may comprise and/or otherwise be associated with one or more differing region queries and/or populate procedures. Numerous other embodiments are disclosed herein and variations are within the scope of this disclosure.

Example of Generating a Pattern

Referring now to FIG. 5, FIGS. 5A-H illustrate aspects of generating a pattern according to various embodiments. In one embodiment, a procedural model corresponding to a particular pattern needs to satisfy at least two requirements. In this embodiment, the procedural model needs to always generate a result and the procedural model needs to be easily evolved. In some embodiments, each procedural model must satisfy one or both of these requirements.

Figure 5A:
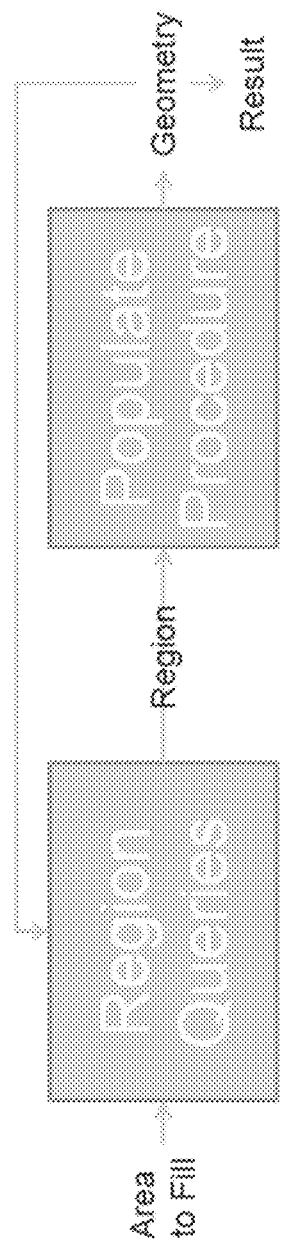
FIGS. 5A-H illustrate aspects of generating a pattern according to various embodiments.
Figure 5B:
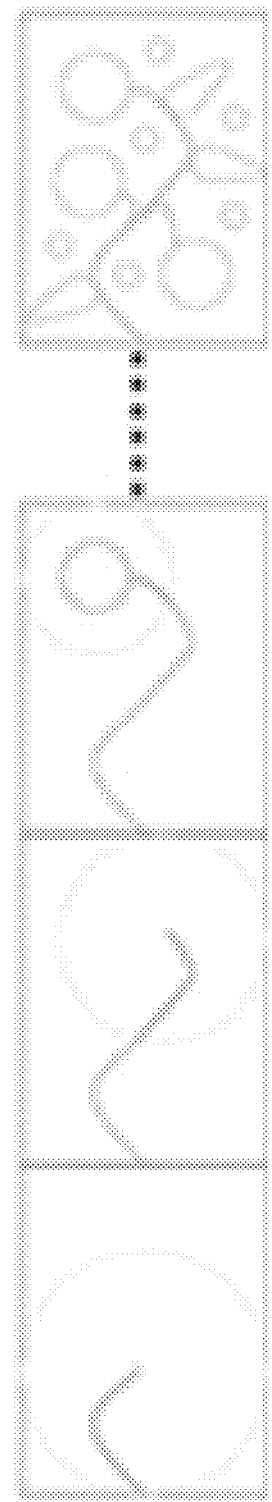

As shown in FIG. 5A, in one embodiment, a procedural model comprises a procedural pipeline including region queries and a populate procedure. In this embodiment, the procedural pipeline starts with an area to be filled such as the one or more selected areas received in block 410 of method 400. Region queries can then be performed to determine an available region within the area to be filled. In embodiments, various procedural models comprise and/or are otherwise associated with different region queries. With the information obtained from the region queries, a populate procedure can be performed to populate one or more geometries inside the region. In embodiments, various procedural models comprise and/or are otherwise associated with different populate procedures. The region queries and the populate procedure may repeat until the area to be filled is covered as shown in FIG. 5B. In embodiments, a model generates and/or processes regions differently than another procedural model.

A region query may perform any number of tasks. For example, a region query may provide one or more regions based at least in part on one or more algorithms. A region can be associated with a shape, position, size, and/or rotation information. Any number of algorithms may be used for region queries. In one embodiment, a biggest region algorithm is implemented for a region query. The biggest region algorithm may support one or more shaped regions, such as a circle region. In one embodiment, the biggest region algorithm uses Delaunay Triangulation to determine the largest empty circle that touches a boundary or an existing geometry. For example, the sites of Delaunay Triangulation may be placed along a geometries' boundary at an interval. The Delaunay Triangles may be updated when a new geometry is added. In one embodiment, a list of all the triangles is kept. The list may be sorted by the triangles' circumcircle radius. In this embodiment, the largest circumcircle radius may represent the biggest available circle region.

Figure 5C:
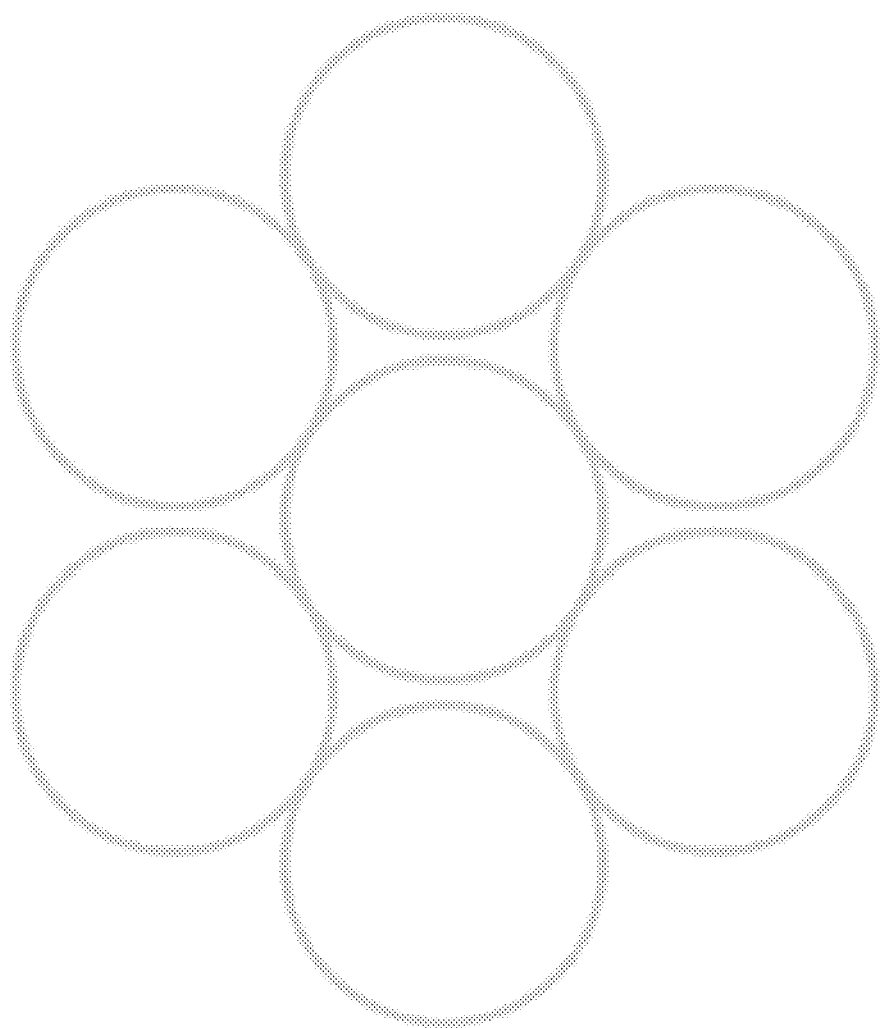

In another embodiment, a grid region algorithm is implemented for a region query. For example, a procedural model may request a set of regions that fill an area in uniform pattern. As shown in FIG. 5C, region positions are provided in a grid-like style. In embodiments, a start position, a length, a direction of two sides of the grid, an output radius, and/or a style of output order may be defined. In one embodiment, a sequence of algorithms for region queries is performed. For example, a determination may first be made as to whether there are any user predefined regions and then the remaining area may be filled using a biggest empty circle region algorithm. In one embodiment, a region query returns the shape of a selected region. A region query may return an already placed geometry that is touching or close to the selected region. Numerous other embodiments are disclosed herein and variations are within the scope of this disclosure.

In embodiments, a region query provides information about other geometries inside and/or touching a current region within the area to be filled. The information provided by the region query can be used by the populate procedure to determine a particular procedure to use. In embodiments, a region query provides functions to obtain other information related to a current state of a pattern. For example, a region query may include functions to add a boundary, determine a nearest point, determine an intersection, calculate the distance to a boundary, and/or other functions. In some embodiments, a pixel buffer is maintained. The pixel buffer can include information associated with one or more pixels in the area to be filled. For example, a pixel buffer may store, for each pixel, information indicating whether the pixel is filled and/or geometries covering the pixel.

As discussed above, with the information obtained from the region queries, a populate procedure can be performed to populate one or more geometries inside one or more regions. Thus, for each region and/or one or more geometries that are touched by or near a region, a new geometry may be generated. In one embodiment, the generation of the geometries is controlled by one or more decision trees. For example, each populate procedure can be associated with one or more decision trees. In embodiments, a decision tree associated with one populate procedure can be different than a decision tree associated with another populate procedure.

In a decision tree, arithmetic operations may be used to determine which part of the tree (i.e. which branches of the tree) is used. Any number of geometries can be placed based on a shape, size, and/or orientation of a selected area and/or the size of nearby geometries. In one embodiment, a default tree or node is used. Such an embodiment may prevent a region from being unfilled. Furthermore, a default tree may ensure that some pattern is generated when populate procedures and/or region queries are mutated and/or crossed over.

In embodiments, a populate procedure includes one or more procedure packages and/or one or more decision trees. The one or more procedure packages may be used to manage parameters and procedures used to populate geometries. A procedure can include, for example, a vine, a side vine and flower, a leaf, an umlaut, other procedures, or a combination thereof. Parameters can include, for example, a maximum vine angle, a minimum vine angle, a vine tension, a minimum vine region size, a maximum flower radius, a minimum flower region size, a leaf start angle, a leaf end angle, a starting leaf tension, an ending leaf tension, a minimum leaf region size, a maximum leaf length, a umlaut radius, a minimum umlaut region size, other parameters, or a combination thereof. A decision tree can be used to determine which procedure to use.

In some embodiments, similar geometries are organized into one or more procedure packages. A procedure package can contain functions, procedures, and/or parameters. A procedure package can be a C++ dynamic-link library (DLL), a JavaScript Object, a group of scalable vector graphic (SVG) files, or any other suitable file or collection of files.

Figure 5D:
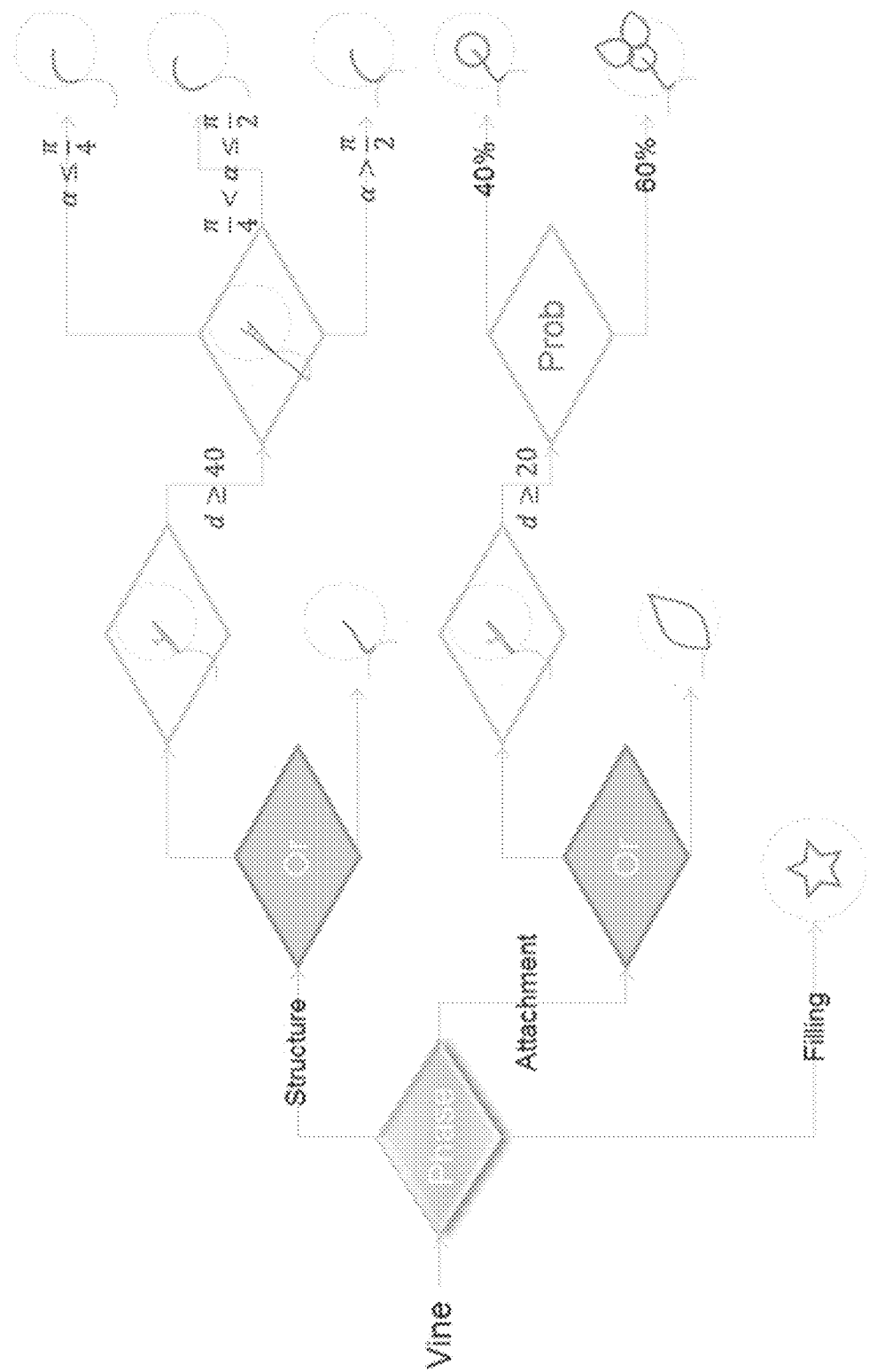
Figure 5E:
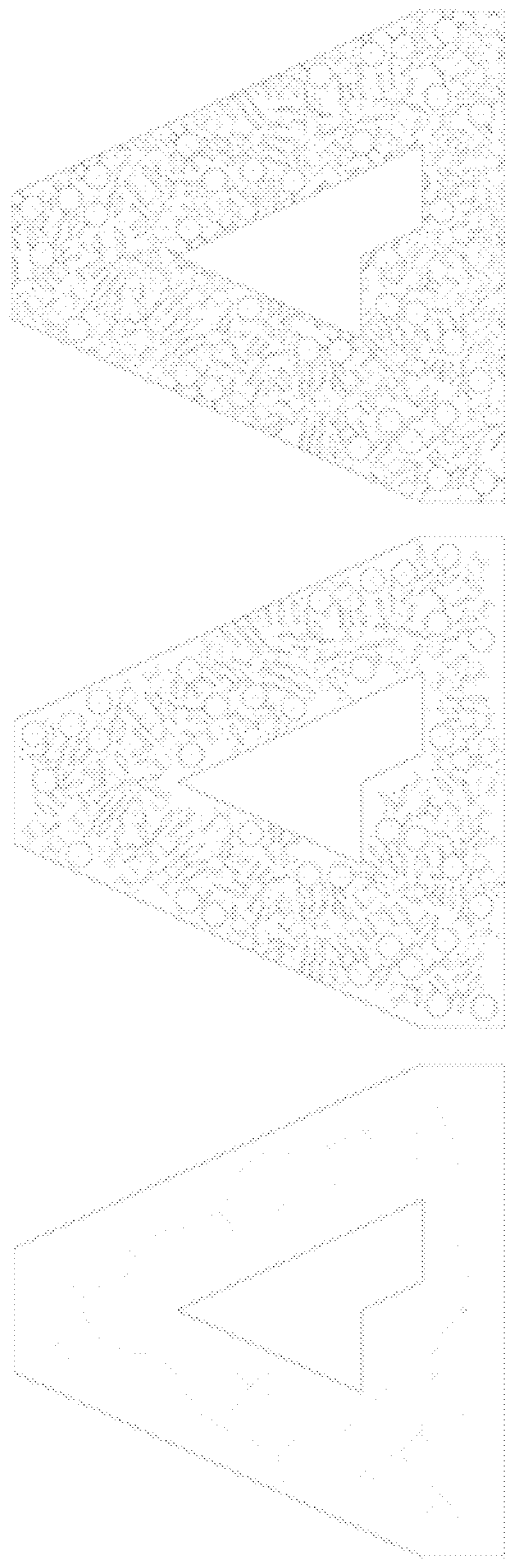

FIG. 5D provides an example of one decision tree according to an embodiment. A decision tree can include various nodes. For example, the decision tree shown in FIG. 5D includes phase switch nodes, conditional nodes, logical or nodes, and populate nodes. A phase switch node may be advanced based on a region's size. For example, in FIG. 5D, there are three phase switch nodes: structure, attachment, and filling. In the structure phase, geometries may be extended to cover the main portion of the area to be filled. Additional geometries can be added as attachments to the structure during the attachment phase. During the filling stage empty space within the area to be filled can be filled with other geometries. FIG. 5E illustrates the filling in of an area using a decision tree over various stages.

As discussed above and as discussed further herein, one or more new patterns can be generated in numerous ways. For example, a populate package may be evolved and used to generate a new pattern. In one embodiment, one or more parameters in a package are mutated and used to generate a new pattern. In another embodiment, a component of one package is crossed with a compatible component of another package and used to generate a new pattern. Thus, in embodiments, populate packages may be mutated or crossed and used to generate a new pattern. Numerous other embodiments are disclosed herein and variations are within the scope of this disclosure.

A decision tree may be evolved and used to generate a new pattern. For example, a decision tree may be mutated and/or crossed with another compatible decision tree and used to generate a new pattern. In one embodiment, a variable, comparison, and/or function associated with a conditional node of a decision tree is mutated and used to generate a new pattern. In another embodiment, a procedure associated with a populate node of a decision tree is mutated and used to generate a new pattern. For example, a different procedure may be randomly selected from a list of compatible procedures and the selected pattern may be used to replace a procedure associated with a particular populate node. In one embodiment, a mutation for a non-leaf node is made by switching a branch with another compatible branch or by removing the branch from the decision tree. Various local parameters associated with one or more nodes of a decision tree may be mutated and used to generate a new pattern. In one embodiment, a single node of a decision tree is mutated and/or crossed and used to generate a new pattern. In other embodiments, two or more nodes of a decision tree are mutated and/or crossed and used to generate a new pattern.

In one embodiment, a populate package and a decision tree are evolved and used to generate a new pattern. In other embodiments, either a populate package or a decision tree is evolved and used to generate a new pattern. One or more parameters in one or more packages can be modified to generate a new pattern. As another example, if two packages are compatible then package crossover can occur to generate a new pattern. Thus, the parameters of one package can be crossed with the parameters of another, compatible package to generate a new pattern. In some embodiments, one or more mutations within a decision tree can occur to generate a new pattern. For example, local parameters can be changed to generate a new pattern. In some embodiments, one or more branches of a decision tree can be removed from the decision tree to generate a new pattern. In other embodiments, one or more branches of a decision tree can be switched with other branches in the decision tree to generate a new pattern. Variables, comparison types, and/or functions for a conditional node of a decision tree may be changed to generate a new pattern. For example, a compatible function from a plurality of compatible functions may be randomly selected and used to generate a new pattern. Similarly, a procedure selected from a plurality of compatible procedures may be randomly selected. In some embodiments, crossover between two or more trees may be performed to generate a new pattern. Numerous other embodiments are disclosed herein and variations are within the scope of this disclosure.

Figure 5F:
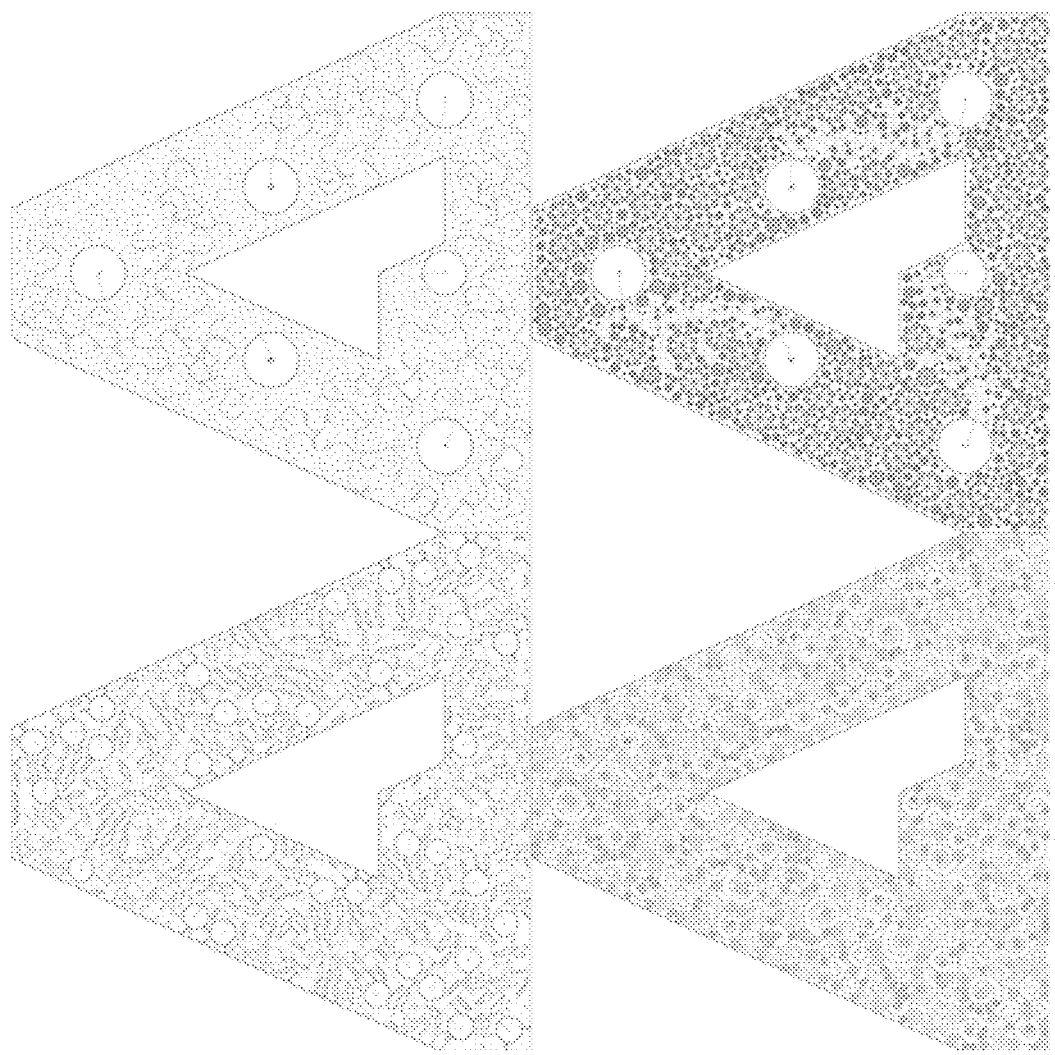
Figure 5G:
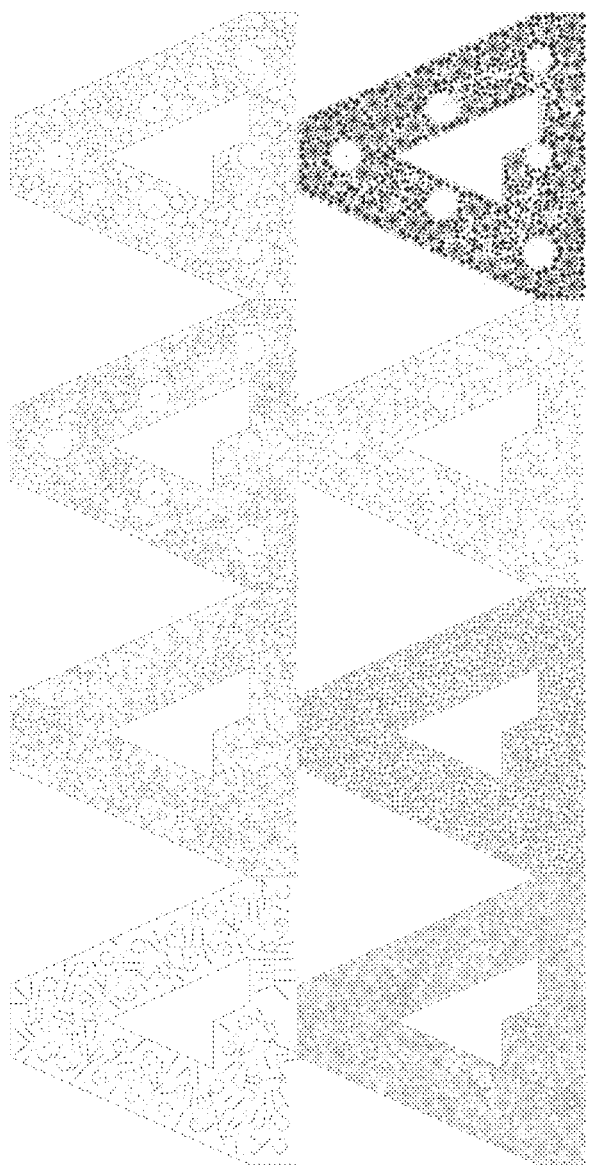
Figure 5H:
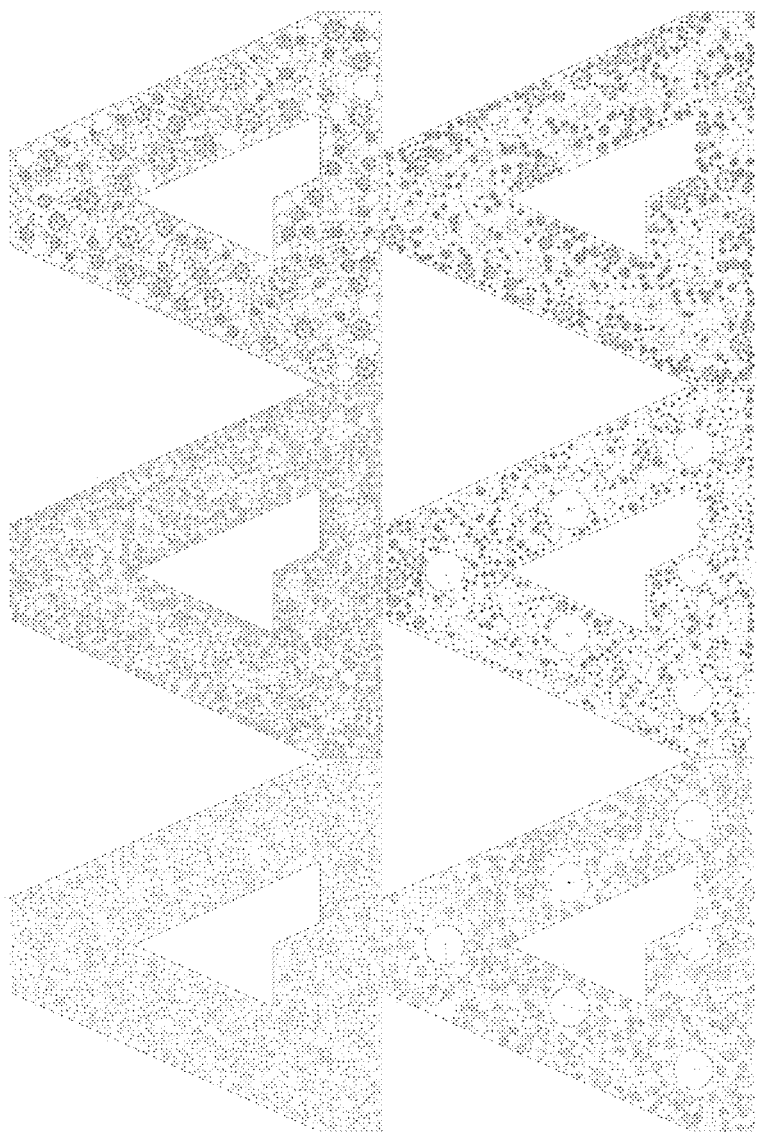

FIG. 5F illustrates results from a predefined procedure model according to an embodiment. FIG. 5G illustrates results from mutation of the predefined procedure model according to an embodiment. FIG. 5H illustrates results from crossover of the predefined procedure model according to an embodiment. Numerous other embodiments are disclosed herein and variations are within the scope of this disclosure.

Referring back to FIG. 4, after one or more patterns are generated 420, the method 400 proceeds to block 425. In block 425, a determination is made as to whether one of the generated patterns is satisfactory. If a determination is made that none of the generated patterns is satisfactory, then the method 400 proceeds to block 430. If a determination is made that a generated pattern is satisfactory, then the method 400 proceeds to block 435.

A determination as to whether a generated pattern is satisfactory may be made in any number of ways. In one embodiment, input is received from a user input device that indicates whether one of the generated patterns is satisfactory. For example, referring to FIG. 2, the processor 220 of the electronic device 200 may receive input indicating whether one of the generated patterns is satisfactory through one or more user input devices 250. In another embodiment, the electronic device 200 may receive input indicating whether one of the generated patterns is satisfactory from another device through the network interface 230. For example, referring to FIG. 3, tablet computer 320 may receive information indicating whether one of the generated patterns is satisfactory from desktop computer 330 through network 310. The desktop computer 330 may send information indicating whether one of the generated patterns is satisfactory to the tablet computer 320 in response to receiving input from one or more user input devices associated with the desktop computer 330. The desktop computer 330 may send information indicating whether one of the generated patterns is satisfactory to the tablet computer 320 in response to receiving a request from the tablet computer 320. In other embodiments, the desktop computer 330 pushes information indicating whether one of the generated patterns is satisfactory to the tablet computer 320 without receiving a request from the tablet computer 320.

A determination as to whether one of the generated patterns is satisfactory may be made or received by an image editing application being executed on the electronic device 200. For example, referring to FIG. 2, the memory 210 may have program code stored thereon for an image editing application. In this embodiment, the processor 220 may receive program code for the image editing application that is configured to receive a determination as to whether one of the generated patterns is satisfactory. In another embodiment, the processor 220 receives program code configured to determine whether one of the generated patterns is satisfactory through the network interface 230. For example, referring to FIG. 3, tablet computer 320 may receive program code for receiving a determination as to whether one of the generated patterns is satisfactory from another device, such as desktop computer 330, through network 310.

In embodiments, a determination as to whether one of the generated patterns is satisfactory is based at least in part on a selection of one of the generated patterns. For example, in one embodiment, if a single generated pattern is selected, then a determination that the selected generated pattern is satisfactory may be made. In this embodiment, if two or more generated patterns are selected or if a generated pattern and another predefined pattern is selected, then a determination may be made that none of the generated patterns is satisfactory. As another example, a determination as to whether one of the generated patterns is satisfactory may be based at least in part on the selection of an object displayed within an interface. For example, an image editing application may include an interface that displays at least the generated patterns. In this embodiment, the interface may comprise selectable buttons that indicate whether one of the generated patterns is satisfactory. Thus, if one of the generated patterns is selected and then an "OK" button on the interface is selected, then a determination may be made that the selected generated pattern is satisfactory. As another example, if one or more of the generated patterns and/or one or more predefined patterns is selected and/or de-selected and then a "Generate" button on the interface is selected, then a determination may be made that none of the generated patterns is satisfactory. In one embodiment, a determination that none of the generated patterns is satisfactory is made when a "Refresh" button or a "Regenerate" button displayed on an interface is selected. Numerous other embodiments are disclosed herein and variations are within the scope of this disclosure.

Referring back to FIG. 4, in block 425 if a determination is made that none of the generated patterns are satisfactory, then the method 400 proceeds to block 430. In block 430 the selection and/or de-selection of one or more predefined patterns and/or the selection and/or de-selection of one or more generated patterns is received. Once the selection and/or de-selection of the predefined patterns and/or the generated patterns is received, the method 400 proceeds to block 420 where additional patterns are generated.

The selection and/or de-selection of one or more predefined patterns and/or one or more generated patterns may be received in any number of ways. For example, referring to FIG. 2, the processor 220 of the electronic device 200 may receive selection and/or de-selection of one or more predefined patterns and/or one or more generated patterns through one or more user input devices 250. In another embodiment, the electronic device 200 may receive selection and/or de-selection of one or more predefined patterns and/or one or more generated patterns from another device through the network interface 230. For example, referring to FIG. 3, tablet computer 320 may receive selection and/or de-selection of one or more predefined patterns and/or one or more generated patterns from desktop computer 330 through network 310. The desktop computer 330 may send information indicating the selection and/or de-selection of one or more predefined patterns and/or one or more generated patterns to the tablet computer 320 in response to receiving input from one or more user input devices associated with the desktop computer 330. The desktop computer 330 may send information indicating the selection and/or de-selection of one or more predefined patterns and/or one or more generated patterns to the tablet computer 320 in response to receiving a request from the tablet computer 320. In other embodiments, the desktop computer 330 pushes information indicating the selection and/or de-selection of one or more predefined patterns and/or or more generated patterns to the tablet computer 320 without receiving a request from the tablet computer 320.

The selection and/or de-selection of one or more predefined patterns and/or one or more generated patterns may be received by an image editing application being executed on the electronic device 200. For example, referring to FIG. 2, the memory 210 may have program code stored thereon for an image editing application. In this embodiment, the processor 220 may receive program code for the image editing application that is configured to request and/or receive selection and/or de-selection of one or more predefined patterns and/or one or more generated patterns. In another embodiment, the processor 220 receives program code configured to request and/or receive selection and/or de-selection of one or more predefined patterns and/or one or more generated patterns through the network interface 230. For example, referring to FIG. 3, tablet computer 320 may receive program code for receiving selection and/or de-selection of one or more predefined patterns and/or one or more generated patterns from another device, such as desktop computer 330, through network 310.

Selection and/or de-selection of one or more predefined patterns and/or one or more generated patterns may be received in any number of ways. For example, selection and/or de-selection of one or more predefined patterns and/or one or more generated patterns may be received through an input device associated with an electronic device. As another example, selection and/or de-selection of one or more predefined patterns and/or one or more generated patterns can be received through a network interface associated with an electronic device. A selection or de-selection may be associated with a particular predefined pattern or a particular generated pattern. In other embodiments, a selection or de-selection may comprise a selection or de-selection of one or more predefined patterns and/or one or more generated patterns.

Selection and/or de-selection of one or more predefined patterns and/or one or more generated patterns can be made within an image editing application. For example, an image editing application being executed on an electronic device may receive selection and/or de-selection of one or more predefined patterns and/or one or more generated patterns. The image editing application may display an interface that enables a user to select and/or de-select one or more predefined patterns and/or one or more generated patterns. The interface may include checkboxes, radio buttons, or other indications configured to show which, if any, of the predefined patterns and/or generated patterns are selected. For example, the interface may shade areas associated with selected predefined patterns and/or selected generated patterns.

The selection and/or de-selection of one or more predefined patterns and/or one or more generated patterns may be received via an interface in numerous ways. For example, selection and/or de-selection of one or more predefined patterns and/or one or more generated patterns may be received via a mouse, a keyboard, a touch-sensitive input device, other input devices, or a combination thereof. Thus, in embodiments, a predefined pattern and/or a generated pattern may be selected by using a mouse to position a cursor over a portion of an interface corresponding to the predefined pattern and/or the generated pattern and clicking a button on the mouse. As another example, if the electronic device comprises a touch-screen display, then a user may be able to select and/or de-select a particular predefined pattern and/or a particular generated pattern by contacting a location of the touch-screen display corresponding to that predefined pattern and/or the generated pattern. In one embodiment, a thumbnail image or another representation of a particular predefined pattern and/or a particular generated pattern may be displayed and that predefined pattern and/or that generated pattern may be selected by selecting the thumbnail image or other representation of the predefined pattern and/or generated pattern.

Likewise, in embodiments, the predefined pattern and/or the generated pattern may be de-selected by selecting the thumbnail image or other representation of the predefined pattern and/or generated pattern if the predefined pattern and/or generated pattern is currently selected. Thus, in embodiments, a predefined pattern and/or a generated pattern may be selected or de-selected by selecting a representation corresponding to a particular predefined pattern and/or a particular generated pattern. Examples of representations include, but are not limited to, an image such as a thumbnail image corresponding to a particular pattern, text corresponding to a predefined pattern, an identifier corresponding to a particular pattern, or another visual representation that corresponds with a particular pattern. Numerous other embodiments are disclosed herein and variations are within the scope of this disclosure.

Referring back to FIG. 4, in block 425 if a determination is made that a generated pattern is satisfactory, then the method 400 proceeds to block 435. In block 435, an updated view is displayed. For example, referring to FIG. 2, an updated view may be displayed on display 240. As another example, the updated view may include the selected generated pattern being displayed within one or more selected areas of one or more images. In embodiments, an image editing application being executed on an electronic device may generate an updated view. For example, an image editing application may display the selected generated pattern within the received selection of an area of an image being edited in the image application. Thus, referring to FIG. 3, tablet computer 320 comprises a display and the image editing application being executed on the tablet computer 320 may display the selected generated pattern within a selected area of an image on the display. Numerous other embodiments are disclosed herein and variations are within the scope of this disclosure.

Referring back to FIG. 4, after displaying an updated view 435, the method 400 proceeds to block 440. In block 440, one or more images are saved. For example, referring to FIG. 2, the processor 220 of the electronic device 200 may store one or more images in the memory 210. In another embodiment, the processor 220 of the electronic device 200 stores one or more images in one or more storage mediums such as a hard disk drive, flash drive, another suitable storage device, or a combination thereof. In another embodiment, the electronic device 200 sends one or more images to another device through the network interface 230 for storage. For example, referring to FIG. 3, tablet computer 320 may store one or more images at web server 350 and/or data store 360 through network 310. The tablet computer 320 may send one or more images to the web server 350 in response to receiving a request from the web server and/or another computing device in communication with the tablet computer 320. In other embodiments, the tablet computer 320 pushes one or more images to the web server 350 and/or data store 360 without receiving a request from another device.

A saved image can include at least a portion of the updated view. For example, a saved image may include a selected generated pattern in one or more selected areas of the image. As another example, if multiple areas were selected, one or more images may be saved with the selected areas being populated using a selected generated pattern. In some embodiments, one or more selected areas may be filled with a selected generated pattern and one or more images containing the selected areas are saved. Numerous other embodiments are disclosed herein and variations are within the scope of this disclosure.

An image may be stored by an image editing application being executed on the electronic device 200. For example, referring to FIG. 2, the memory 210 may have program code stored thereon for an image editing application. In this embodiment, the processor 220 may receive program code for the image editing application from memory 210 and execute at least a portion of the program code for the image editing application to store one or more images. In another embodiment, the processor 220 receives program code for an image editing application from another device through the network interface 230. For example, referring to FIG. 3, tablet computer 320 may receive program code for an image editing application stored at web server 350 and/or data store 360 through network 310. In this embodiment, the image editing application may contain instructions that cause one or more images to be stored in one or more storage devices. Numerous other embodiments are disclosed herein and variations are within the scope of this disclosure.

General

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an That which is claimed:

1. A method comprising:
   receiving a selection of an area;
      receiving a selection of a predefined pattern from a plurality of predefined patterns, the selected predefined pattern corresponding to a procedural model that was used to generate the selected predefined pattern, wherein the procedural model is defined in a way that is suitable for genetic exploration, wherein each predefined pattern in the plurality of predefined patterns corresponds with a respective procedural model, wherein each procedural model comprises at least one region query and at least one populate procedure;
   generating a pattern based at least in part on the selected predefined pattern by modifying the procedural model and using the modified procedural model to generate the pattern; and
   applying the generated pattern to at least a portion of the selected area.

2. The method of claim 1, further comprising: receiving an image, wherein receiving the selection of the area comprises receiving a selection of a portion of the image.

3. The method of claim 2, wherein receiving the selection of the portion of the image comprises:
   receiving a selection of a layer of the image; and
   receiving a selection of an area within the selected layer.

4. The method of claim 2, wherein receiving the selection of the portion of the image comprises receiving a selection of at least two areas within the image.

5. The method of claim 1, further comprising:
   receiving at least one of the plurality of predefined patterns from a database or a library.

6. The method of claim 1, wherein receiving the selection of the predefined pattern from the plurality of predefined patterns comprises:
   receiving a selection of at least two predefined patterns from the plurality of predefined patterns.

7. The method of claim 1, wherein receiving the selection of the predefined pattern from the plurality of predefined patterns comprises:
   receiving a selection of a representation corresponding to the predefined pattern; and
   in response to receiving the selection of the representation, selecting the corresponding predefined pattern.

8. The method of claim 1, wherein the generated pattern is based at least in part on the received selection of the area.

9. The method of claim 1, further comprising:
   receiving a selection of the generated pattern; and
   generating a second pattern based at least in part on the selected generated pattern, wherein filling the selected area with the generated pattern comprises filling the selected area with the second generated pattern.

10. A method comprising:
    receiving a selection of an area;
       receiving a selection of a predefined pattern from a plurality of predefined patterns, the selected predefined pattern corresponding to a predefined procedural model that was used to generate the selected predefined pattern, wherein the predefined procedural model is associated with a parameter, and is defined in a way that is suitable for genetic exploration,
       and wherein generating the pattern based at least in part on the selected predefined pattern by modifying the predefined procedural model comprises changing a value of the parameter and using the modified predefined procedural model to generate the pattern; and
    applying the generated pattern to at least a portion of the selected area.

11. A method comprising:
    receiving a selection of an area;
       receiving a selection of a predefined pattern from a plurality of predefined patterns, the selected predefined pattern corresponding to a predefined procedural model that was used to generate the selected predefined pattern, wherein the predefined procedural model is associated with a decision tree, and is defined in a way that is suitable for genetic exploration;
          wherein generating the pattern based at least in part on the selected predefined pattern by modifying the predefined procedural model comprises changing a portion of the decision tree with a compatible portion of another decision tree associated with a second predefined pattern and using the modified predefined procedural model to generate the pattern; and
    applying the generated pattern to at least a portion of the selected area.

12. The method of claim 1, wherein the generated pattern is based at least in part on the selected predefined pattern, a previously generated pattern, and the selected area.

13. A non-transitory computer-readable medium comprising program code for:
    receiving selection of an area of an image;
    receiving selection of a first subset of a plurality of predefined patterns;
    generating a first plurality of patterns, at least one generated pattern in the first plurality of patterns being based at least in part on one or more predefined patterns in the first subset;
    receiving selection of a second subset of patterns, at least one pattern in the second subset of patterns being selected from the plurality of predefined patterns or the first plurality of generated patterns;
    generating a second plurality of patterns, at least one generated pattern in the second plurality of patterns being based at least in part on one or more patterns in the second subset; receiving selection of a generated pattern from the second plurality of patterns; and
    populating the area of the image with the selected generated pattern, wherein each pattern in the plurality of predefined patterns corresponds with a respective procedural model that is defined in a way that is suitable for genetic exploration.

14. The non-transitory computer-readable medium of claim 13, wherein generating the first plurality of patterns, at least one generated pattern in the first plurality of patterns being based at least in part on one or more predefined patterns in the first subset comprises:
    determining a parameter associated with a first predefined pattern in the first subset; modifying the parameter; and
    generating a pattern, the pattern based at least in part on the first predefined pattern and the modified parameter.

15. The non-transitory computer-readable medium of claim 13, wherein generating the first plurality of patterns, at least one generated pattern in the first plurality of patterns being based at least in part on one or more predefined patterns in the first subset comprises:
- determining a first building block associated with a first predefined pattern in the first subset;
- determining a second building block associated with a second predefined pattern in the first subset, wherein the second building block is compatible with the first building block;
- generating a pattern, the pattern based at least in part on the first predefined pattern and the second building block.

16. The non-transitory computer-readable medium of claim 13, wherein generating the first plurality of patterns, at least one generated pattern in the first plurality of patterns being based at least in part on one or more predefined patterns in the first subset further comprises:
- determining a first building block associated with a first predefined pattern in the first subset;
- modifying a parameter associated with the first predefined pattern; determining a second building block associated with a second predefined pattern in the first subset, wherein the second building block is compatible with the first building block;
- generating a pattern, the pattern based at least in part on the first predefined pattern, the modified parameter, and the second building block.

17. The non-transitory computer-readable medium of claim 13, further comprising program code for:
- receiving at least one of the plurality of predefined patterns from a remote device.

18. The non-transitory computer-readable medium of claim 13, wherein receiving selection of the first subset of the plurality of predefined patterns comprises:
- receiving selection of a representation corresponding to a predefined pattern in the plurality of predefined patterns; and
- in response to receiving selection of the representation, including the corresponding predefined pattern in the first subset.

19. A system comprising:
- a display;
- an input device;
- a memory; and
- a processor in communication with the display, the input device, and the memory, the processor configured for:
  - receiving, via the input device, selection of an area of an image; displaying, on the display, a plurality of predefined patterns;
  - in response to receiving, via the input device, selection of a first subset of the plurality of predefined patterns, generating a first plurality of patterns, at least one generated pattern in the first plurality of generated patterns being based at least in part on one or more predefined patterns in the first subset;
  - displaying, on the display, the first plurality of generated patterns; in response to receiving, via the input device, selection of a second subset of the first plurality of generated patterns, generating a second plurality of patterns, at least one generated pattern in the second plurality of generated patterns being based at least in part on one or more patterns in the second subset; displaying, on the display, the second plurality of generated patterns; and
  - in response to receiving, via the input device, selection of a generated pattern from the second plurality of generated patterns, displaying, on the display, the area of the image comprising the selected generated pattern.

* * * * *